(12) United States Patent
Satou et al.

(10) Patent No.: US 7,695,405 B2
(45) Date of Patent: Apr. 13, 2010

(54) SHIFT SHOCK REDUCING APPARATUS FOR POWER TRAIN

(75) Inventors: Katsunori Satou, Kanagawa (JP); Kenichiro Murakami, Kanagawa (JP); Hiroyuki Takenaka, Kanagawa (JP); Yuzuru Tohta, Yokohama (JP); Kan Yagi, Shizuoka (JP); Jun Yoshino, Shizuoka (JP)

(73) Assignees: Nissan Motor Co., Ltd., Yokohama-shi (JP); Jatco Ltd, Fuji-shi (JP)

( * ) Notice: Subject to any disclaimer, the term of this patent is extended or adjusted under 35 U.S.C. 154(b) by 360 days.

(21) Appl. No.: 11/882,992

(22) Filed: Aug. 8, 2007

(65) Prior Publication Data
US 2008/0051254 A1 Feb. 28, 2008

(30) Foreign Application Priority Data
Aug. 28, 2006 (JP) ............................. 2006-230290
May 15, 2007 (JP) ............................. 2007-128783

(51) Int. Cl.
*F16H 59/26* (2006.01)
(52) U.S. Cl. ...................... 477/127; 477/107; 477/130
(58) Field of Classification Search ................ 477/101, 477/107, 110, 111, 127, 130, 156
See application file for complete search history.

(56) References Cited

U.S. PATENT DOCUMENTS

| 4,742,732 A | * | 5/1988 | Hiramatsu | 477/119 |
| 5,085,105 A | * | 2/1992 | Wakahara et al. | 477/148 |
| 6,638,196 B2 | * | 10/2003 | Murasugi et al. | 477/156 |

FOREIGN PATENT DOCUMENTS

JP  07-139381 A  5/1995

* cited by examiner

*Primary Examiner*—Ha D. Ho
(74) *Attorney, Agent, or Firm*—Foley & Lardner LLP

(57) ABSTRACT

A shift shock reducing apparatus for a power train having an engine and an automatic transmission having a frictional element that is to be engaged at upshift, comprising a control section that executes, during upshift, a torque down of the engine that starts before the start of an inertia phase in which a gear ratio of the transmission is changing from a before-shift gear ratio to an after-shift gear ratio, and a control section that makes larger a rising gradient of working oil pressure that is supplied to the frictional element to be engaged at upshift when the torque down that starts before the start of the inertia phase is executed than that when the torque down is not executed.

7 Claims, 4 Drawing Sheets

SHIFT SHOCK REDUCING APPARATUS FOR POWER TRAIN

BACKGROUND OF THE INVENTION

The present invention relates to an apparatus in a power train including an engine and an automatic transmission, for reducing a shift shock of the automatic transmission by a torque down control of the engine.

An automatic transmission varies in input rotation at gearshift due to a change of gear ratio, which variation in input rotation causes an inertia torque which is causative of a shift shock.

More specifically, in case, for example, the automatic transmission is shifted from a lower gear ratio to a higher gear ratio, the transmission input rotation is decreased by an amount corresponding to the difference between the gear ratios, which decrease in input rotation causes a release of torque for inertia (inertia torque) which in turn causes a shift shock.

As a countermeasure for a shift shock of a power train which occurs due to such a theory is used in many cases a technique for decreasing an engine torque thereby offsetting the inertia torque (torque down control).

Since during an inertia phase in which an effective gear ratio that is a ratio between input and output rotations of the automatic transmission is changing from a before-shift gear ratio to an after-shift gear ratio, a variation in the input rotation occurs due to a change of the gear ratio and causes an inertia torque that is causative of a shift shock, it is generally practiced to execute a torque down of the engine (torque down control) during the inertia phase.

In the meantime, since the toque down of the engine will start after the start of the inertia phase if started after detection of the start of the inertia phase, which start of the inertia phase is detected through detection of the start of a change of an effective gear ratio from a before-shift gear ratio to an after-shift gear ratio, a shift shock due to a release of toque at the initial stage of the inertia phase cannot be avoided.

Thus, as described in Unexamined Japanese Patent Publication No. 07-139381, it has heretofore been proposed an apparatus for reducing a shift shock of a power train, which is adapted to execute, according to the necessity, a toque down (herein referred to as pre-torque down) that causes an engine torque to start decreasing gradually before the start of the inertia phase, i.e., during a torque phase, specifically, from the time after the issuing of a gearshift instruction and before the start of the inertia phase and thereafter a large decrease in toque of the engine is executed during the inertia phase.

SUMMARY OF THE INVENTION

However, since in the prior art apparatus, the working oil pressure control that controls the gearshift of the automatic transmission remains as it was even at the time of such a pre-torque down, there is a fear of such a problem that at the time of gearshift the frictional elements for gearshift may possibly be balanced with the transmission input torque when the transmission torque capacity is low and at this moment the transmission output torque is largely pulled down to cause a large downshift shock.

Referring to FIG. 4, the above-described problem will be described with respect to the case an upshift instruction is issued at the moment t1 for upshifting from a currently selected gear position or gear range (n range) to a target gear range (n+1 range) and gear shift (upshift) is performed in response thereto.

Such an upshift is performed by decreasing the working oil pressure (instruction value) Po that is discharged from a release side frictional element that is to be released at gearshift along the decreasing gradient shown by the one-dot chain line while increasing the working oil pressure (instruction value) Pc that is supplied to an engagement side frictional element that is to be engaged at gearshift along the increasing gradient shown by the solid line (by the dotted line after a halfway point).

In case during the upshift, the engine torque down amount ΔTedown is determined as shown by the dotted line and the engine torque Te is decreased as shown by the dotted line only during the inertia phase in which the effective gear ratio Gr (=input rotation Ni/output rotation No) is changing from a value equivalent to the selected gear range (n range) to a value equivalent to the target gear range (n+1 range) as shown by the dotted line, the transmission output torque To makes a time change as shown by the dotted line.

On the other hand, in case the engine torque down amount ΔTedown is determined as shown by the solid line and the engine torque Te is gradually decreased from the moment t2 during the torque phase that is previous to the inertia phase, as shown by the solid line (the pre-torque down of the engine is executed), decrease of the input rotation Ni starts at an earlier stage by the effect of the pre-torque down and the inertia phase also starts at an earlier state as will be apparent from the effective gear ratio as shown by the solid line.

After the moment t3 at which the inertia phase starts as described above, the engine torque Te is decreased at a stretch to a predetermined value for prevention of shift shock as shown by the solid line while controlling, in response to this, the working oil pressure Pc of the engagement side frictional element so that the working oil pressure Pc assumes a value indicated by the solid line.

However, since even at the time of such a pre-torque down the working oil pressure control of the engagement side frictional element according to an earlier technology is made without consideration of a change of transmission input torque due to the pre-torque down of the engine, the transmission torque capacity of the engagement side frictional element is balanced at a lower value with the transmission input torque, thus causing the transmission output torque To to make a time change as shown by the solid line and be largely drawn as indicated by ΔTo thereby causing a fear of a large shift shock.

It is accordingly an object of the present invention to provide a shift shock reducing apparatus that is free from such a fear by making different a working oil pressure control of an engagement side frictional element at the time a pre-torque down of an engine is executed and that at the time the pre-torque down is not executed.

To achieve the above object, the present invention provides a shift shock reducing apparatus for a power train having an engine and an automatic transmission having a frictional element that is to be engaged at upshift, comprising a control section that executes, during upshift, a torque down of the engine that starts before the start of an inertia phase in which a gear ratio of the transmission is changing from a before-shift gear ratio to an after-shift gear ratio, and a control section that makes larger a rising gradient of working oil pressure that is supplied to the frictional element to be engaged at upshift when the torque down that starts before the start of the inertia phase is executed than when the torque down is not executed.

DESCRIPTION OF THE PREFERRED EMBODIMENT

Figure 1:
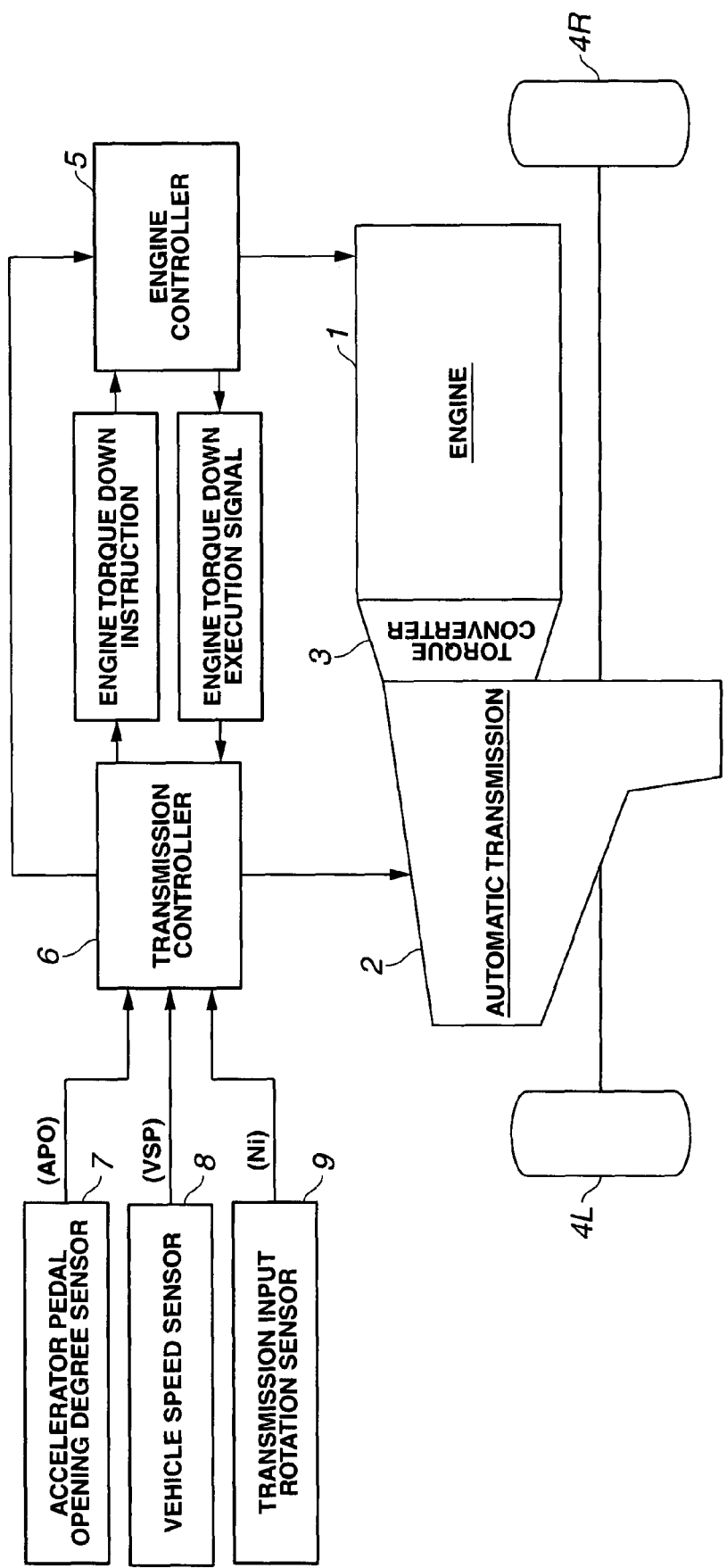
FIG. 1 is a schematic view showing a vehicle power train having a shift shock reducing apparatus according to an embodiment of the present invention.

Referring first to FIG. 1, a power train includes an engine 1 and an automatic transmission 2. The engine 1 and the automatic transmission 2 are coupled with each other by way of a connection/disconnection element 3 such as a torque converter and an electromagnetic clutch.

The automatic transmission 2 employed in this embodiment is a step-type transmission and adapted to select a gear range through a selective hydraulic operation (engagement) of a plurality of frictional elements (wet clutches, wet brakes, etc.) and to be shifted to another gear range by changing the frictional elements (wet clutch, wet brake or the like) that are selected to perform the hydraulic operation.

The automatic transmission 2 is an automatic transaxle having a built-in differential gear and connected at an output shaft to left and right driving wheels (front wheels) by way of the differential gear.

In the power train of FIG. 1, the power from the engine 1 is inputted through the connection/disconnection element 3 to the automatic transmission 2, the automatic transmission 2 changes the engine power according to the selected gear range, and the changed engine power is transmitted from the differential gear to the left and right driving wheels (front wheels) 4L and 4R to drive the vehicle.

Though not shown, the engine 1 has within an intake pipe an electronically controlled throttle valve, the throttle opening degree TVO of which varies basically depending upon a variation of an amount of depression of an accelerator pedal (accelerator opening degree) APO but which is of the type capable of executing a torque down and a torque up of the engine 1 by controlling the throttle opening degree TVO suitably in accordance with an engine output (torque) control demand (torque down control demand for reducing a shift shock), separately from the accelerator opening degree APO.

The engine 1 is operated by igniting, by a spark from a spark plug, a mixture of an intake air of an amount that is controlled by the throttle valve and a fuel that is supplied by injection of an injector.

The electronic control of the throttle valve, the control of the amount of fuel supplied by the injector and the control of the ignition timing of the spark plug are executed by the engine controller 5 together with other controls of the engine 1 (e.g., valve lift control of intake and exhaust valves and valve opening and closing timing control for compression ratio control), thereby determining the engine output.

Accordingly, in this embodiment, for the engine torque control for shift shock reduction can be used a single of or any combination of an engine torque control by a throttle opening degree control, an engine torque control by a fuel supply amount control, an engine torque control by an ignition timing control, an engine torque control by an intake/exhaust valve lift control and an engine toque control by a compression ratio control.

The automatic transmission 2 is controlled by the transmission controller 6, and to the transmission controller 6 are inputted, in addition to an engine torque down execution signal for shift shock reduction from the engine controller 5, a signal from the accelerator opening degree sensor 7 for detecting the accelerator opening degree APO, a signal from the vehicle speed sensor 8 for detecting a vehicle speed VSP and a signal from a transmission input rotation sensor 9 for detecting a transmission input rotation Ni.

At automatic gearshift of the automatic transmission 2, the transmission controller 6 obtains from the above-described information a target gear range on the basis of a predetermined gearshift map and does not execute gearshift when the selected gear range coincides with the target gear range but executes gearshift from the selected gear range to the target gear range when the selected gear range does not coincide with the target gear range.

At the time of gearshift, the frictional element that is to be engaged for selection of the target gear range is engaged by increasing the working oil pressure supplied thereto and the frictional element that is to be released for selection of the gear range is released by decreasing the working oil pressure supplied thereto, thereby executing gearshift from the selected gear range to the target gear range.

In the meantime, in case the gearshift is upshift, the transmission controller 6 issues an engine torque down instruction for prevention of shift shock, according to the necessity as shown in FIG. 1, for performing a torque down including the above-described pre-torque down and the engine controller 5 executes a control for realizing the torque down, as an electronic control of the throttle opening degree.

At upshift of the automatic transmission 2, the transmission controller 6 executes a control program shown in FIG. 2 and thereby performs the working oil pressure control of the frictional elements, which the present invention aims at, as follows.

Figure 2:
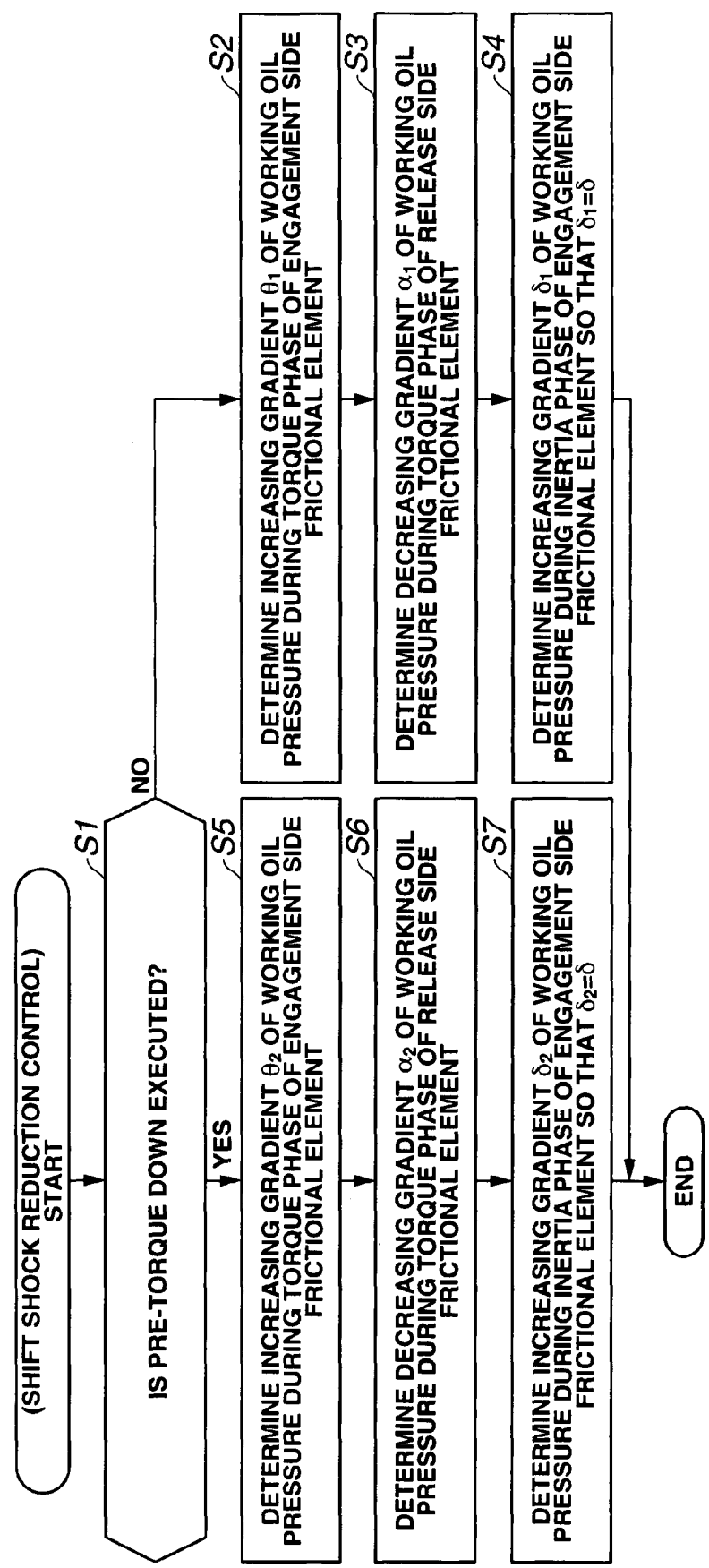
FIG. 2 is a flowchart of a main routine for a shift shock reduction control executed by the shift shock reducing apparatus of FIG. 1.

In step S1 of FIG. 2, it is checked, on the basis of an engine torque down execution signal from the engine controller 5, whether a pre-torque down of the engine is executed at a torque phase before the start of an inertia phase.

If the pre-torque down of the engine is not executed, the program goes to step S2 where a rising gradient $\theta 1$ of working oil pressure, which represents a rate of increase of the working oil pressure per unit time, during the torque phase of the engagement side frictional element is determined by using a map for exclusive use, based on the engine torque Te and the vehicle speed VSP.

In this instance, the rising gradient $\theta 1$ of the working oil pressure during the torque phase of the engagement side frictional element is determined so as to become larger or steeper as the engine torque Te becomes larger or the vehicle speed VSP becomes higher.

Then, in step S3, by using an exclusive map, a falling gradient $\alpha 1$ of the working oil pressure during the torque phase of the engagement side frictional element is determined on the basis of the engine torque Te and the vehicle speed VSP.

In this connection, the falling gradient $\alpha 1$ of the working oil pressure during the torque phase of the engagement side frictional element is determined so as to become larger or steeper as the engine torque Te becomes larger or the vehicle speed VSP becomes higher.

Then, in step S4, a rising gradient $\delta 1$ of the working oil pressure during the inertia phase of the engagement side frictional element is calculated by multiplying the rising gradient θ 1 during the torque phase of the engagement side frictional element by a predetermined operation coefficient.

If it is determined in step S1 that a pre-torque down of the engine is executed during the torque phase, the program goes to step S5 where a rising gradient θ 2 of the working oil pressure during the torque phase of the engagement side frictional element is determined based on the engine torque Te and the vehicle speed VSP by using an exclusive map.

In this connection, while the rising gradient θ 2 of the working oil pressure during the torque phase of the engagement side frictional element is determined so as to become larger or steeper as the engine torque Te becomes larger or the vehicle speed VSP becomes higher, it is made larger or steeper than θ 1 that is determined in step S2 when the pre-torque down is not executed, in comparison under the same running condition (under the same engine torque Te and the same vehicle speed VSP).

Then, in step S6, a falling gradient α 2 of the working oil pressure during the torque phase of the release side frictional element is determined based on the engine torque Te and the vehicle speed VSP by using an exclusive map.

In this connection, while the falling gradient α 2 of the working oil pressure supplied to the release side frictional element during torque phase is determined so as to become larger or steeper as the engine torque Te becomes larger or the vehicle speed VSP becomes higher, it is made larger or steeper than α 1 that is determined in step S3 when the pre-torque down is not executed, in comparison under the same running condition (under the same engine torque Te and the same vehicle speed VSP).

Then, in step S7, a rising gradient δ 2 of the working oil pressure during the inertia phase of the engagement side frictional element is calculated by multiplying the rising gradient θ 2 of the working oil pressure Pc during the torque phase of the engagement side frictional element by a predetermined operation coefficient.

In this connection, the operation coefficient is determined so that the rising gradient δ 2 of working oil pressure Pc during the inertia phase of the engagement side frictional element is set at δ that is equal to δ 1 obtained through calculation in step S4 when the pre-torque down is not executed.

The working oil pressure control for the frictional elements by the control of FIG. 2 will be described with reference to FIG. 3.

Figure 3:
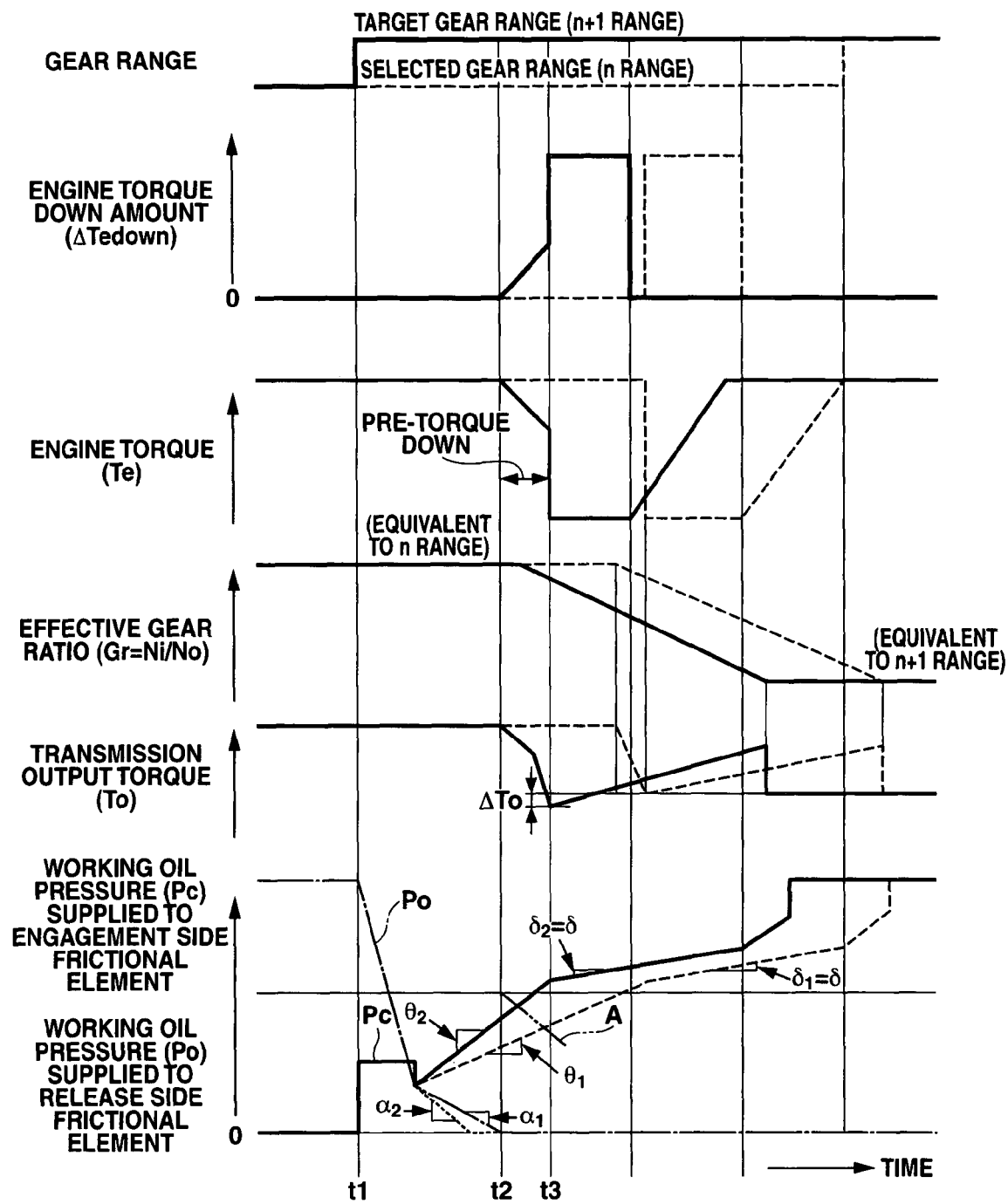
FIG. 3 is a motion-time chart for the shift shock reduction control of FIG. 2.
Figure 4:
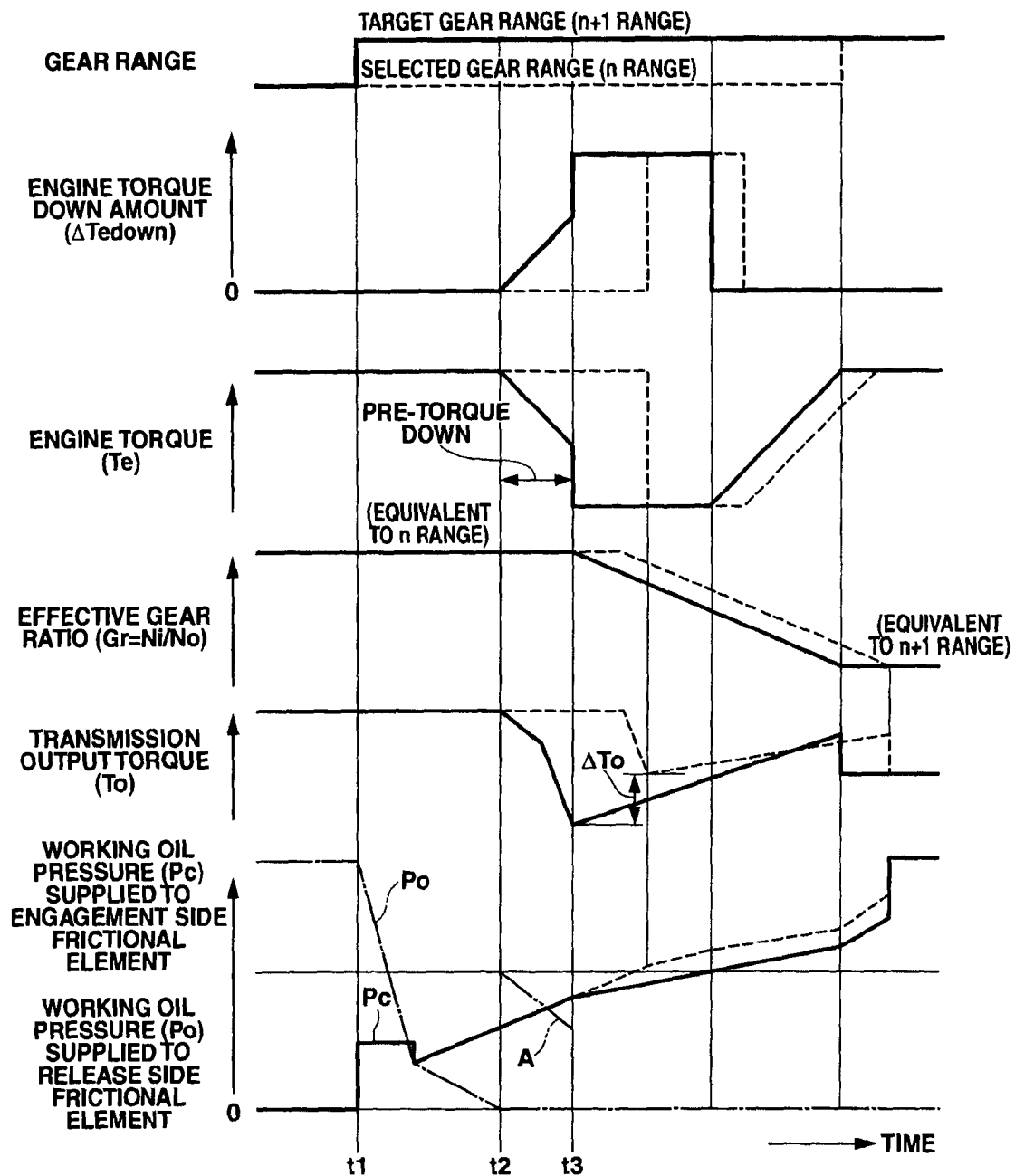
FIG. 4 is a motion-time chart of a shift shock reduction control according to an earlier technology.

FIG. 3 is a motion-time chart in case an upshift instruction for shifting from a selected gear range (n range) that is currently selected at the moment t1 to a target gear range (n+1 range) is outputted and a gear shift (upshift) is performed in response to the instruction.

The upshift is performed by decreasing the working oil pressure Po of the release side frictional element that is to be released at gearshift while increasing the working oil pressure Pc of the engagement side frictional element that is to be engaged at gearshift.

In case, during the upshift, an engine torque-down amount ΔTedown is determined as shown by the dotted line thereby decreasing the engine torque Te only during the inertia phase in which the effective gear ratio Gr is changing from a value equivalent to a selected gear range (n range) to a value equivalent to a target gear range (n+1 range), the transmission output torque To is caused to make a time change as shown by the dotted line by determining the rising gradient of the working oil pressure during the torque phase of the release side frictional element so as to be gradual as α 1, determining the rising gradient of the working oil pressure during the torque phase of the engagement side frictional element so as to be gradual as θ 1, and determining the rising gradient of the working oil pressure during the inertia phase of the engagement side frictional element so that δ1=δ.

However, in case the engine torque-down amount ΔTedown is determined as shown by the solid line thereby causing the engine torque Te to decrease gradually from the moment t2 during the torque phase previous to the inertia phase as shown by the solid line (i.e., in case a pre-torque down of the engine is performed), decrease in the input rotation Ni starts earlier in response thereto thereby causing the inertia phase to also start earlier as is apparent from a variation of the actually effective gear ratio Gr shown by the solid line.

From this moment t3 onward after the inertia phase starts, the engine torque Te is decreased to a predetermined value for prevention of shift shock at a stretch as shown by the solid line.

In case the pre-torque down is performed during the time period from t2 to t3 and thereafter the primary torque down is performed, the working oil pressure PC supplied to the engagement side frictional element is controlled as shown by the solid line to cause the rising gradient θ 2 of the working oil pressure Pc during the torque phase of the engagement side frictional element to become larger or steeper than the rising gradient θ 1 in case the pretorque down is not executed.

However, the rising gradient δ 2 of the working oil pressure during the inertia phase of the engagement side frictional element is set at δ that is equal to the gradient δ 1 in case the pre-torque down is not executed.

By making a time series control of the working oil pressure Pc supplied to the engagement side frictional element as described above, the transmission output torque To is caused to make a time change as shown by the dotted line.

In the meantime, in this embodiment, the working oil pressure Pc supplied to the engagement side frictional element during the torque phase in case the pre-torque down is executed is controlled so as to be higher than that in case the pre-torque down is not executed since θ2>θ1, so that in case, for example, the input torque is decreased as shown by the two-dot chain line A, there never occurs such a case in which the transmission output torque is balanced with the transmission input torque when the transmission torque capacity is low, thus causing the transmission output torque To make a time change as shown by the solid line and thereby making a pull-in torque ΔTo smaller to enable to wipe off a fear of occurrence of a large shift shock.

Furthermore, since it is realized, by determining the rising gradient of the working oil pressure Pc so that θ2>θ1, to make higher the working oil pressure Pc supplied to the engagement side frictional element when the pre-torque down is executed than when the pre-torque down is not executed, it becomes possible to attain the above-described effect by a simple control.

Further, since the rising gradient of working oil pressure Pc during the inertia phase of the engagement side frictional element is determined so as to be the same between the case the pre-torque down is executed and the case the pre-torque is not executed (δ2=δ1=δ), provided that the engine torque Te and the vehicle speed VSP are the same, a shift shock reducing action during the inertia phase can be realized both in case the pre-torque down is executed and in case the pre-torque down is not executed.

Further, since in this embodiment the falling gradient α 2 of the working oil pressure Po during the torque phase of the release side frictional element in case the pre-torque down is executed is determined so as to be steeper than the falling gradient α 1 in case the pre-torque down is not executed, thereby accelerating decrease of the working oil pressure Po of the release side frictional element, the working oil pressure Po discharged from the release side frictional element is controlled so as to be lower during the torque phase in case the pre-torque down is executed than in case the pre-torque down is not executed, the following effect can be obtained.

In case the working oil pressure Pc supplied to the engagement side frictional element is made higher when the pre-torque down is executed than when the pre-torque down is not executed as described above, the sum of the transmission torque capacities of the engagement side frictional element and the release side frictional element becomes excessively large during the torque phase, thus causing a tendency to a reduced speed shock due to a tendency of the automatic transmission toward interlock. However, such a tendency can be eliminated by determining the working oil pressure Po discharged from the release side frictional element so as to be lower when the pre-torque down is executed than when the pre-torque down is not executed.

Furthermore, since it is realized, by determining the falling gradient of the working oil pressure Po so that $\alpha 2 > \alpha 1$, to make the working oil pressure Po discharged from the release side frictional element be lower when the pre-torque down is executed than when the pre-torque down is not executed, the above-described effect can be attained with a simple control.

The entire contents of Japanese Patent Applications P2006-230290 (filed Aug. 28, 2006) and P2007-128783 (filed May 15, 2007) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while the embodiment has been described with respect to the case where the rising gradient of the working oil pressure Pc on the engagement side during the torque phase is maintained constantly at θ 2, this is not for the purpose of limitation and the rising gradient may first be set at θ 1 and then changed to θ 2 at or adjacent the moment t2 and onward, or the rising gradient may first be set at θ 2 and then changed to θ 1 at or adjacent the moment t2 and onward. Further, while the embodiment has been described with respect to the case where the working oil pressure Pc during the inertia phase is determined on the basis of the rising gradient during the torque phase, this is not for the purpose of limitation but any control will do, provided that the control is executed irrespective of whether the pre-torque down is executed or not, for example, a feedback control based on the same target gear ratio changing rate will do. The scope of the invention is defined with reference to the following claims.

What is claimed is:

1. A shift shock reducing apparatus for a power train having an engine and an automatic transmission including a frictional element that is to be engaged at upshift, comprising:
    a control section that executes, during upshift, a torque down of the engine that starts before the start of an inertia phase in which a gear ratio of the transmission is changing from a before-shift gear ratio to an after-shift gear ratio; and
    a control section that makes larger a rising gradient of working oil pressure that is supplied to the frictional element to be engaged at upshift when the torque down of the engine that starts before the start of the inertia phase is executed than when the torque down of the engine is not executed.

2. A shift shock reducing apparatus according to claim 1, wherein the transmission further includes a frictional element that is to be released at upshift, the shift shock reducing apparatus further comprising a control section that makes larger a falling gradient of working oil pressure that is discharged from the frictional element to be released at upshift when the torque down of the engine that starts before the start of the inertia phase is executed than when the torque down of the engine is not executed.

3. A shift shock reducing apparatus according to claim 2, further comprising a control section that controls, during the inertia phase, the working oil pressure supplied to the frictional element to be engaged at upshift on the basis of a running condition of a vehicle equipped with the power train, irrespective of whether the torque down of the engine that starts before the start of the inertia phase is executed or not.

4. A shift shock reducing apparatus for a power train having an engine and an automatic transmission including a frictional element that is to be engaged at upshift, comprising:
    means for executing, during upshift, a torque down of the engine that starts before the start of an inertia phase in which a gear ratio of the transmission is changing from a before-shift gear ratio to an after-shift gear ratio; and
    means for making larger a rising gradient of working oil pressure that is supplied to the frictional element to be engaged at upshift when the torque down of the engine that starts before the start of the inertia phase is executed than when the torque down of the engine is not executed.

5. A power train for a vehicle comprising:
    an engine;
    an automatic transmission having a frictional element that is to be engaged at upshift;
    a controller for controlling the engine and the automatic transmission;
    the controller having a control section that executes, during upshift, a torque down control of the engine that starts before the start of an inertia phase in which a gear ratio of the transmission is changing from a before-shift gear ratio to an after-shift gear ratio and a control section that makes larger a rising gradient of working oil pressure that is supplied to the frictional element to be engaged at upshift when the torque down control of the engine that starts before the start of the inertia phase is executed than when the torque down control of the engine is not executed.

6. A power train according to claim 5, wherein the transmission further includes a frictional element that is to be released at the upshift before the start of the inertia phase, and wherein the controller further includes a control section that makes larger a falling gradient of working oil pressure that is discharged from the frictional element to be released at upshift when the torque down control of the engine that starts before the start of the inertia phase is executed than when the torque down control of the engine is not executed.

7. A power train according to claim 6, wherein the controller further includes a control section that controls, during the inertia phase, the working oil pressure supplied to the frictional element to be engaged at upshift on the basis of a running condition of a vehicle equipped with the power train, irrespective of whether the torque down of the engine that starts before the start of the inertia phase is executed or not.

* * * * *